United States Patent
Nagasaki

(10) Patent No.: US 6,963,349 B1
(45) Date of Patent: Nov. 8, 2005

(54) INFORMATION PROCESSING APPARATUS, CONTROL METHOD THEREFOR, AND COMPUTER-READABLE MEMORY

(75) Inventor: Katsuhiko Nagasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 09/619,540

(22) Filed: Jul. 19, 2000

(30) Foreign Application Priority Data

Jul. 22, 1999 (JP) .......................................... 11-208017
May 30, 2000 (JP) ...................................... 2000-160610

(51) Int. Cl.[7] .............................................. G09G 5/00
(52) U.S. Cl. ...................... 345/649; 345/783; 345/784; 345/785; 345/786; 345/787; 345/973
(58) Field of Search ................................ 345/784–787, 345/973, 919, 781, 764, 778

(56) References Cited

U.S. PATENT DOCUMENTS

| | | | | |
|---|---|---|---|---|
| 4,542,377 A | * | 9/1985 | Hagen et al. ................ | 345/659 |
| 5,134,390 A | * | 7/1992 | Kishimoto et al. .......... | 248/917 |
| 5,189,404 A | * | 2/1993 | Masimo et al. .............. | 345/634 |
| 5,329,289 A | * | 7/1994 | Sakamoto et al. ........... | 248/922 |
| 5,526,161 A | | 6/1996 | Suzuki et al. ................ | 359/172 |
| 5,592,195 A | * | 1/1997 | Misono et al. ............... | 345/419 |
| 5,598,150 A | | 1/1997 | Suzuki et al. ........... | 340/825.07 |
| 5,661,632 A | * | 8/1997 | Register ...................... | 345/905 |
| 5,814,972 A | | 9/1998 | Shimada et al. ............. | 320/132 |
| 5,828,568 A | | 10/1998 | Sunakawa et al. ........... | 364/184 |
| 5,999,176 A | * | 12/1999 | Kamper ....................... | 345/787 |
| 6,278,443 B1 | * | 8/2001 | Amro et al. ................. | 345/173 |
| 6,326,978 B1 | * | 12/2001 | Robbins ...................... | 345/654 |
| 6,356,287 B1 | * | 3/2002 | Ruberry et al. .............. | 345/863 |
| 6,366,302 B1 | * | 4/2002 | Crosby et al. ............... | 345/783 |

* cited by examiner

Primary Examiner—Matthew C. Bella
Assistant Examiner—Mike Rahmjoo
(74) Attorney, Agent, or Firm—Fitzpatrick, Cella, Harper & Scinto

(57) ABSTRACT

A RAM stores a management table for making the indication state of an indicator in the display direction correspond to control information for controlling the operation an information processing apparatus for the indication state. A CPU detects the indication state of the indicator, and controls the operation of the information processing apparatus on the basis of control information of the management table corresponding to the detection result.

16 Claims, 10 Drawing Sheets

FIG. 9

```
from:xxx@abcd.co.jp
to:yyy@efgh.co.jp                              ～902
先日ははお世話になりました。
早速ですが、次回打ち合わせについて日程を
調整いたしたいと思います。
つきましては、以下の日程のうちご都合の
宜しい日時をお知らせ願えますでしょうか？
出来ましたら本日中に返事を下されば幸いです。

10月24日午前10時30分～12時30分  於：弊社会議室
10月25日午後 3時00分～ 5時00分  於：弊社会議室
                                          以上
        901
```

903

INFORMATION PROCESSING APPARATUS, CONTROL METHOD THEREFOR, AND COMPUTER-READABLE MEMORY

FIELD OF THE INVENTION

The present invention relates to an information processing apparatus having an indicator, a control method therefor, and a computer-readable memory.

BACKGROUND OF THE INVENTION

In many cases, a portable terminal device having a jog dial switch or shuttle switch is operated by a different method from that of a so-called desktop terminal device. The desktop terminal device mainly uses a keyboard or mouse as an input device, whereas the portable terminal device is operated by a pen input or button input. In recent years, input devices such as a shuttle switch and jog dial switch for enabling rotation operation and push operation with one device are becoming available.

The input devices such as a shuttle switch and jog dial switch are used for operations such as switching of the menu and scroll of the display window. This provides the user with high operability because rotation operation or slide operation directly and readily links with an operation on the display window.

The portable terminal device is generally used in the user's hand. Because of a small size, a terminal device whose screen is generally vertically directed can be used with a horizontally elongated screen, and vice versa. In this case, the display direction of the display window is also switched.

In this case, however, the rotational direction of the shuttle switch or jog dial does not coincide with the operating direction on the display window, which has not been considered. This will be exemplified with reference to FIG. 3.

In FIG. 3, when the portable terminal device is used with a vertically elongated screen 4000, rotation operation of a jog dial 406 is vertical rotation operation for the user. When the portable terminal device is used with a horizontally elongated screen 4100, rotation operation of the jog dial 406 is horizontal rotation operation for the user. For example, rotation operation of the jog dial 406 is assigned to vertical scroll of the vertically elongated screen 4000. In this case, even if the user horizontally rotates the jog dial 406 in use with the horizontally elongated screen 4100, the screen is vertically scrolled. The conventional user-friendly device makes the user feel the operation difficult.

SUMMARY OF THE INVENTION

The present invention has been made to overcome the conventional drawbacks, and has as its object to provide an information processing apparatus capable of easily operating the apparatus, a control method therefor, and a computer-readable memory.

To achieve the above object, an information processing-apparatus according to the present invention comprises the following arrangement.

That is, an information processing apparatus having an indicator comprises designation means for designating a display direction of a display, storage means for storing a management table for making an indication state of the indicator in the display direction correspond to control information for controlling an operation of the information processing apparatus for the indication state, detection means for detecting the indication state of the indicator, and control means for controlling the operation of the information processing apparatus on the basis of control information of the management table corresponding to a detection result of the detection means.

The management table preferably makes the indication state of the indicator in the display direction correspond to control information for controlling scroll operation of a display window of the display.

The management table preferably makes the indication state of the indicator in the display direction correspond to control information for controlling focusing operation to a plurality of focusing targets in a display window of the display.

The designation means preferably includes a predetermined icon in the display.

The control means preferably comprises change means for changing contents of the management table on the basis of the indication state of the indicator.

The indicator preferably includes at least either one of a jog dial switch and a shuttle switch.

The detection means preferably detects an indication direction and an indication amount of the indicator.

To achieve the above object, a control method for an information processing apparatus according to the present invention comprises the following steps.

That is, a control method for an information processing apparatus having an indicator comprises the designation step of designating a display direction of a display, the storage step of storing a management table for making an indication state of the indicator in the display direction correspond to control information for controlling an operation of the information processing apparatus for the indication state, the detection step of detecting the indication state of the indicator, and the control step of controlling the operation of the information processing apparatus on the basis of control information of the management table corresponding to a detection result in the detection step.

To achieve the above object, a computer-readable memory according to the present invention comprises the following program codes.

That is, a computer-readable memory which stores program codes for controlling an information processing apparatus having an indicator comprises program codes of the designation step of designating a display direction of a display, the storage step of storing a management table for making an indication state of the indicator in the display direction correspond to control information for controlling an operation of the information processing apparatus for the indication state, the detection step of detecting the indication state of the indicator, and the control step of controlling the operation of the information processing apparatus on the basis of control information of the management table corresponding to a detection result in the detection step.

Other features and advantages of the present invention will be apparent from the following description taken in

BRIEF DESCRIPTION OF THE DRAWINGS

FIG. 9 is a view showing an example of the memory contents of the RAM in the first embodiment.

DETAILED DESCRIPTION OF THE PREFERRED EMBODIMENTS

Preferred embodiments of the present invention will be described in detail below with reference to the accompanying drawings.

First Embodiment

Figure 1:
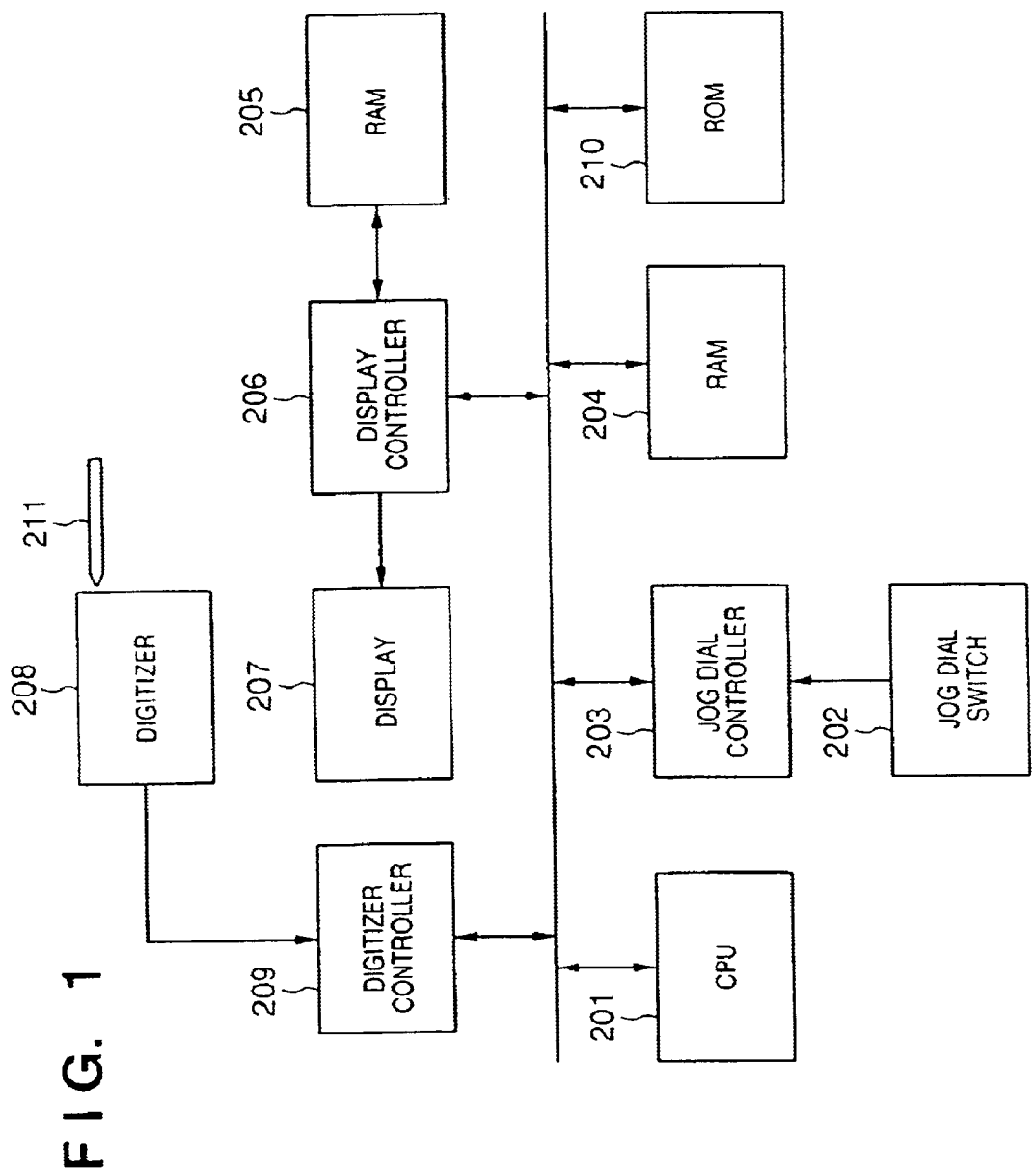
FIG. 1 is a block diagram showing the hardware arrangement of a portable terminal device according to the first embodiment.

FIG. 1 is a block diagram showing the hardware arrangement of a portable terminal device according to the first embodiment.

Figure 2:
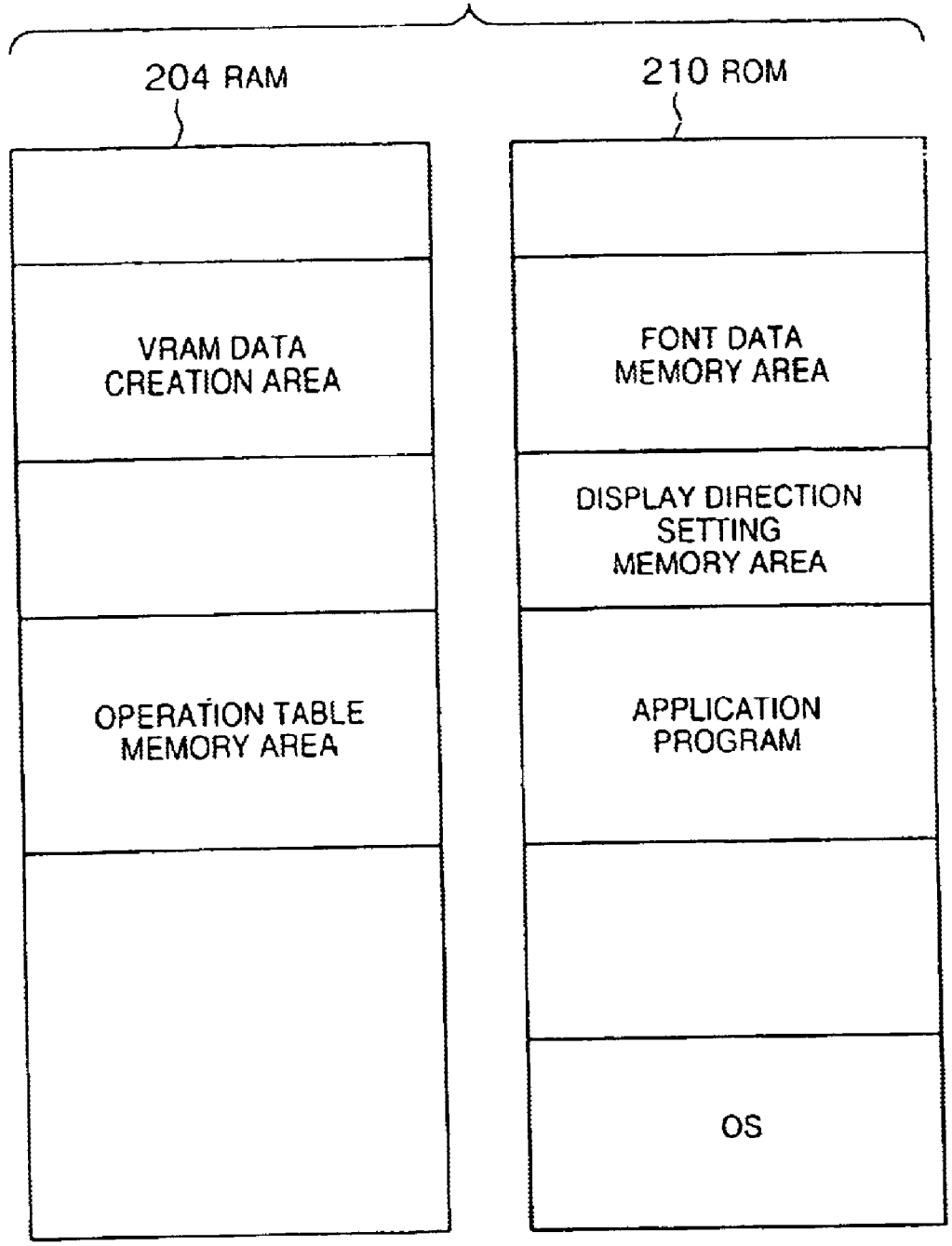
FIG. 2 is a view showing memory maps in a RAM and ROM according to the first embodiment.

Reference numeral 201 denotes a CPU for controlling various building elements of the portable terminal device; 202, a jog dial switch used to operate the display window of a display 207; 203, a jog dial controller for controlling the operation of the jog dial switch; and 204, a RAM functioning as the work areas of various processes and a temporary data save area. The RAM 204 (FIG. 2) has a operation table memory area for storing a jog dial operation table for managing the operation of the jog dial switch 202 of the portable terminal device and an operation of the display window corresponding to this operation, and a VRAM data creation area for creating data for the display window.

Reference numeral 205 denotes a display memory (VRAM) for storing display data to be displayed on the display 207; and 206, a display controller for controlling display of display data stored in the VRAM 205. The display 207 is made up of an LCD (Liquid Crystal Display) and the like, and displays various data, windows, and the like. The display 207 has a rectangular shape, and allows executing an operation on a vertically elongated screen for displaying a display window with the long side directed vertically, or on a horizontally elongated screen for displaying a display window with the long side directed horizontally.

Reference numeral 208 denotes a digitizer for detecting an input from an input pen 211 and outputting a signal corresponding to the detected input; 209, a digitizer controller; and 210, a ROM storing programs and the like. The ROM 210 stores an operating system (OS) for realizing processing on the portable terminal device, and application programs for executing various processes. The ROM 210 has a display direction setting memory area for storing display direction setting representing the display direction of the portable terminal device, and a font data memory area for storing various font data. The input pen 211 enables an input for executing various operations of the portable terminal device using the digitizer 208.

The schematic appearance of the portable terminal device will be described with reference to FIG. 3.

Figure 3:
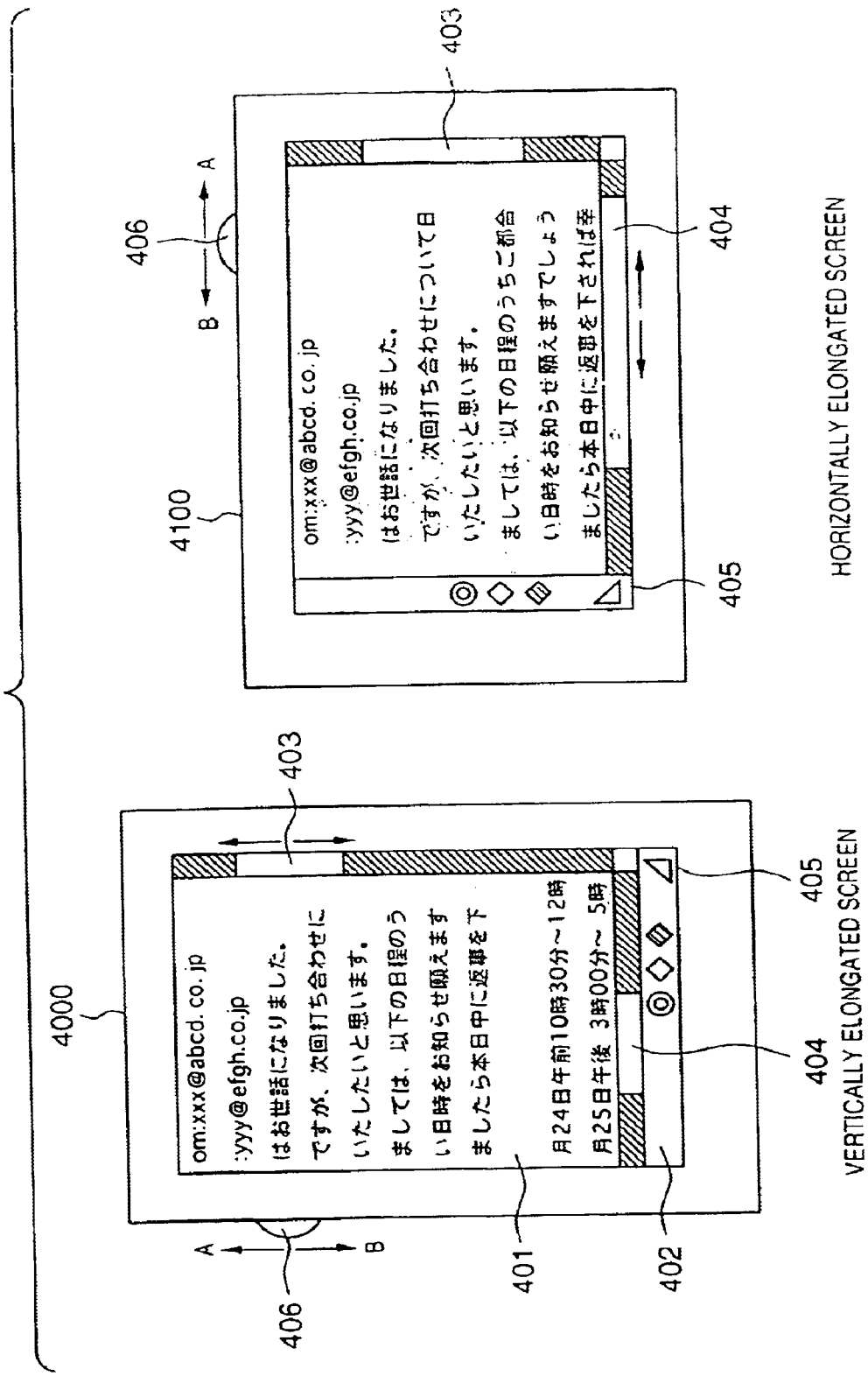
FIG. 3 is a view showing the schematic appearance of the portable terminal device according to the first embodiment.

FIG. 3 is a view showing the schematic appearance of the portable terminal device according to the first embodiment.

As shown in FIG. 3, the portable terminal device can be operated with a vertically elongated screen 4000 and horizontally elongated screen 4100.

On the vertically elongated screen 4000, reference numeral 401 denotes a display window for displaying a window, menu, and the like; 402, a menu display window for executing a predetermined desired operation by tapping icons aligned on the window; 403, a vertical scroll bar for vertically scrolling the display window; 404, a horizontal scroll bar for horizontally scrolling the display window; 405, a display direction change icon (△) indicating a change in the display direction of the display window; and 406, a jog dial switch for executing various operations such as scroll of the display window.

A jog dial operation table in the first embodiment will be described with reference to FIG. 3. The jog dial operation table in the first embodiment is a table for managing control information for the operation of the display window with respect to the operation of the jog dial switch 406 on each of the vertically elongated screen 4000 and horizontally elongated screen 4100 in FIG. 3. More specifically, this table manages control information for realizing the following operations.

Vertically Elongated Screen (1) Rotation of Jog Dial Switch 406 of Vertically Elongated Screen 4000 in Direction A The scroll bar 403 moves up in accordance with the rotation amount, and display contents in the window are scrolled up in accordance with the rotation amount.

(2) Rotation of Jog Dial Switch 406 of Vertically Elongated Screen 4000 in Direction B The scroll bar 403 moves down in accordance with the rotation amount, and display contents in the window are scrolled down in accordance with the rotation amount.

Horizontally Elongated Screen (1) Rotation of Jog Dial Switch 406 of Horizontally Elongated Screen 4100 in Direction A The scroll bar 404 moves to the right in accordance with the rotation amount, and display contents in the window are scrolled to the right in accordance with the rotation amount.

(2) Rotation of Jog Dial Switch 406 of Horizontally Elongated Screen 4100 in Direction B The scroll bar 404 moves to the left in accordance with the rotation amount, and display contents in the window are scrolled to the left in accordance with the rotation amount.

When the display direction of the portable terminal device coincides with the vertically elongated screen 4000, control information of the jog dial operation table for the vertically elongated screen is set. When the display direction of the portable terminal device coincides with the horizontally elongated screen 4100, control information of the jog dial operation table for the horizontally elongated screen is set.

Processing executed in the first embodiment will be described with reference to FIGS. 4 and 5.

Figure 4:
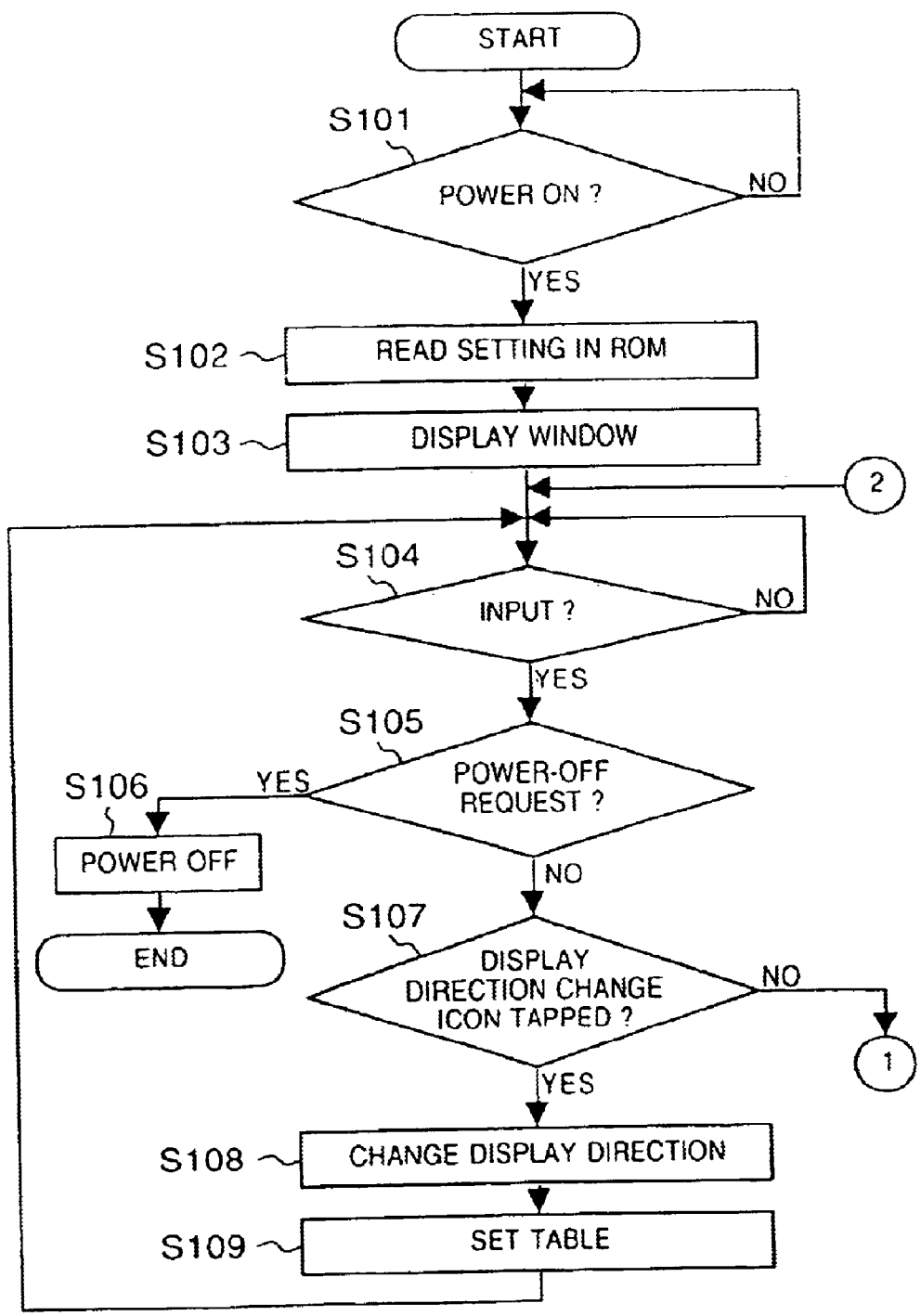
FIG. 4 is a flow chart showing processing executed in the first embodiment.
Figure 5:
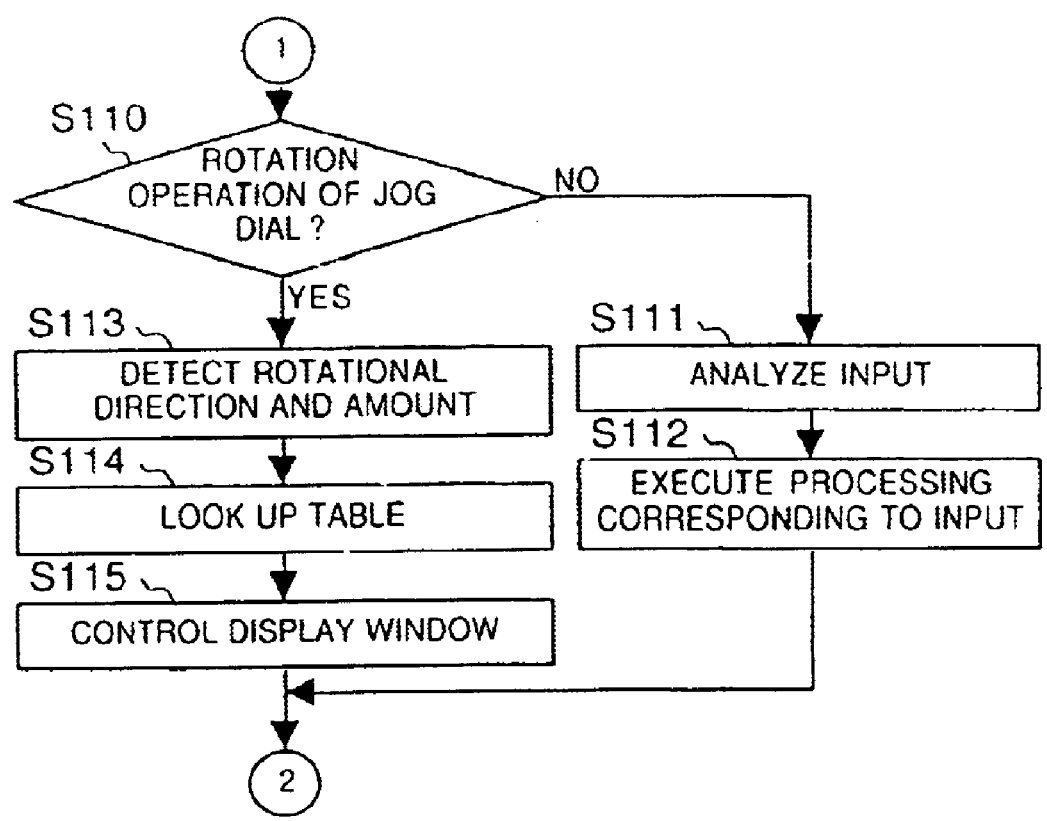
FIG. 5 is a flow chart showing processing executed in the first embodiment.

FIGS. 4 and 5 are flow charts showing processing executed in the first embodiment.

Whether the device is turned on is checked (step S101). If the device is not turned on (NO in step S101), the flow waits until the device is turned on. If the device is turned on (YES in step S101), the flow shifts to step S102. Display direction setting set in the ROM 210 in advance is read (step S102). A window is displayed in accordance with the read display direction setting (step S103). In the first embodiment, the vertically elongated screen 4000 in FIG. 3 is set as the display direction setting.

If window display ends in accordance with the display direction setting, and control information of the jog dial operation table for this display direction (in this case, the vertically elongated screen) is set, whether an input has been received from the user is checked (step S104). If no input has been received (No in step S104), the flow waits until an input is received. If an input has been received (YES in step S104), the flow advances to step S105.

If YES in step S104, whether the input is a power-off request is checked (step S105). If the input is a power-off request (YES in step S105), the flow shifts to step S106 to turn off the device. If the input is not a power-off request (NO in step S105), the flow shifts to step S107.

Whether the input is a tap on the display direction change icon 405 with the input pen 211 is checked (step S107). If the input is not a tap (NO in step S107), the flow shifts to step S110 in FIG. 5. If the input is a tap (YES in step S107), the flow shifts to step S108 in FIG. 5.

The display controller 206 changes the display direction (step S108). Control information of the jog dial operation table is changed to one for the changed display direction (in this case, the horizontally elongated screen) (step S109). Then, the flow returns to step S104 to wait for an input.

If NO in step S107, whether the input is rotation operation of the jog dial switch 406 is checked (step S110). If the input is not rotation operation (NO in step S110), the flow shifts to step S111 to analyze the input. Processing corresponding to the input is executed based on the analysis result (step S112).

If the input is rotation operation (YES in step S110), the jog dial controller 203 detects the rotational direction and rotation amount of rotation operation, and transmits the information to the CPU 201 (step S113). The CPU 201 looks up the jog dial operation table based on the received information (step S114). Then, the display window is controlled based on the looked-up jog dial operation table (step S115). After the display window is controlled, the flow returns to step S104 to wait for an input.

Detailed display direction change operation in step S108 will be explained with reference to FIGS. 9 and 10.

As described above, data of the display 207 is stored in the VRAM 205. As is apparent from the display window of FIG. 3, not the entire text but only part of the text is displayed depending on the window. At this time, data of the entire text is stored in the VARM data creation area of the RAM 204, and only data of an area to be displayed is transferred to the VRAM 205 upon completion of data creation. FIG. 9 shows the relationship between the memory contents of the RAM 204 and data of an area transferred to the VRAM 205.

FIG. 9 is a view showing an example of the memory contents of the RAM in the first embodiment.

In FIG. 9, reference numeral 903 denotes a VRAM data creation area of the RAM 204; 901, an area displayed on the vertically elongated screen 4000, i.e., a data area transferred to the VRAM 205 for the vertically elongated screen 4000; and 902, an area displayed on the horizontally elongated screen 4100, i.e., a data area transferred to the VRAM 205 for the horizontally elongated screen 4100.

Detailed display direction change operation in step S108 in this case will be explained with reference to FIG. 10.

Figure 10:
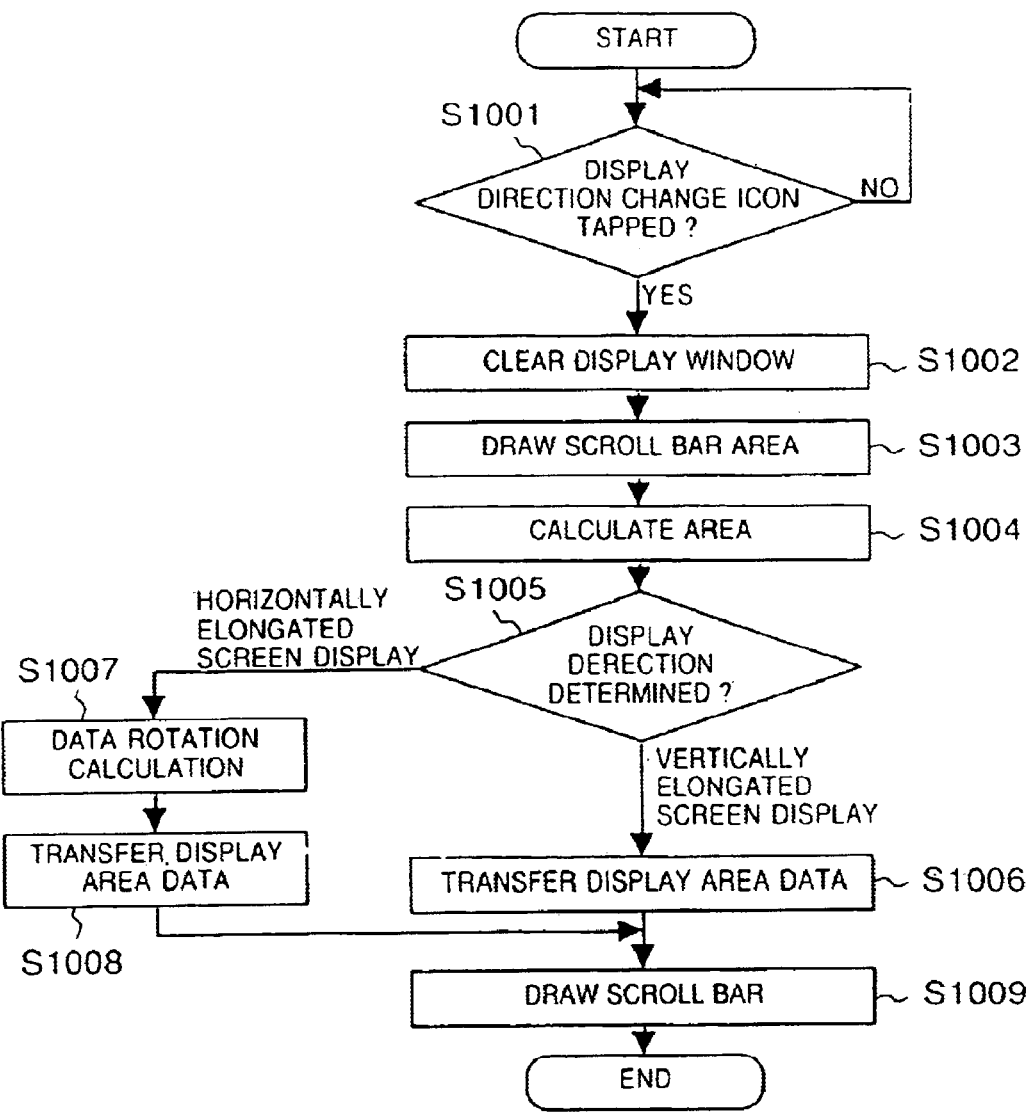
FIG. 10 is a flow chart showing details of step S108 in the first embodiment.

FIG. 10 is a flow chart showing details of step S108 in the first embodiment.

Whether the display direction change icon 405 shown in FIG. 3 has been tapped is checked (step S1001). If the icon 405 has not been tapped (NO in step S1001), the flow waits until the icon 405 is tapped. If the icon 405 has been tapped (YES in step S1001), the flow advances to step S1002, and the CPU 201 instructs the display controller 206 to clear the display window. In accordance with this instruction, the display controller 206 clears data stored in the VRAM 205 except for a data portion corresponding to the menu display window (step S1002). This is because only the menu display window is irrelevant to the display direction.

Both vertical and horizontal scroll bar areas are drawn (step S1003). Since the position and size of each scroll bar are not known, not the scroll bar itself but only its area is drawn. An area to be displayed in the window is calculated from all the display data stored in the VRAM data creation area of the RAM 204 (step S1004).

Data of the calculated area is transferred to the VRAM 205. At this time, which of vertically elongated screen display and horizontally elongated screen display is designated is checked (step S1005). If vertically elongated screen display is designated, the flow shifts to step S1006 to directly transfer the data to the VRAM 205. If horizontally elongated screen display is designated, the flow shifts to step S1007 to execute data rotation calculation for rotating the data through 90°. After data rotation calculation, the data is transferred to the VRAM 205 (step S1008).

After the data is transferred, the position and ratio of the displayed area with respect to all the data stored in the VRAM data creation area of the RAM 204 are calculated, and vertical and horizontal scroll bars are drawn in accordance with the results (step S1009).

A display control method such as scroll of window contents is well known, and a detailed description thereof will be omitted.

According to the first embodiment, rotation operation of the jog dial switch 406 is vertical scroll when the display direction of the portable terminal device coincides with the vertically elongated screen 4000, and horizontal scroll when the display direction coincides with the horizontally elongated screen 4100. Thus, the user-friendly device can be enhanced.

In this embodiment, the display direction upon power-on operation is based on the display direction setting in the ROM 210, but the present invention is not limited to this. For example, a writable nonvolatile memory such as a flash ROM can be employed to store a previous display direction as display direction setting in power-off operation, and the display direction of the display direction setting can be set in the next power-on operation.

The display direction is switched by tapping the display direction change icon 405 with the input pen 211, but the present invention is not limited to this. For example, the display direction may be switched by another means such as a mechanical switch. The display direction is switched between two directions, but the present invention is not limited to this. For example, four directions can be prepared in accordance with the specifications of the portable terminal device.

The menu display window including the display direction change icon 405 is not limited to a liquid crystal display. For example, a seal having a printed image for implementing the function of the display direction change icon 405 can be put on the surface of the digitizer 208, and the user can touch the seal to change the display direction.

Second Embodiment

Although rotation operation of the jog dial switch scrolls the display window in the first embodiment, rotation operation may be associated with another operation. In the second embodiment, rotation operation of the jog dial switch is made to correspond to operation of moving the focus when a plurality of focusing targets are displayed.

A repetitive description to the first embodiment will be omitted.

Figure 6:
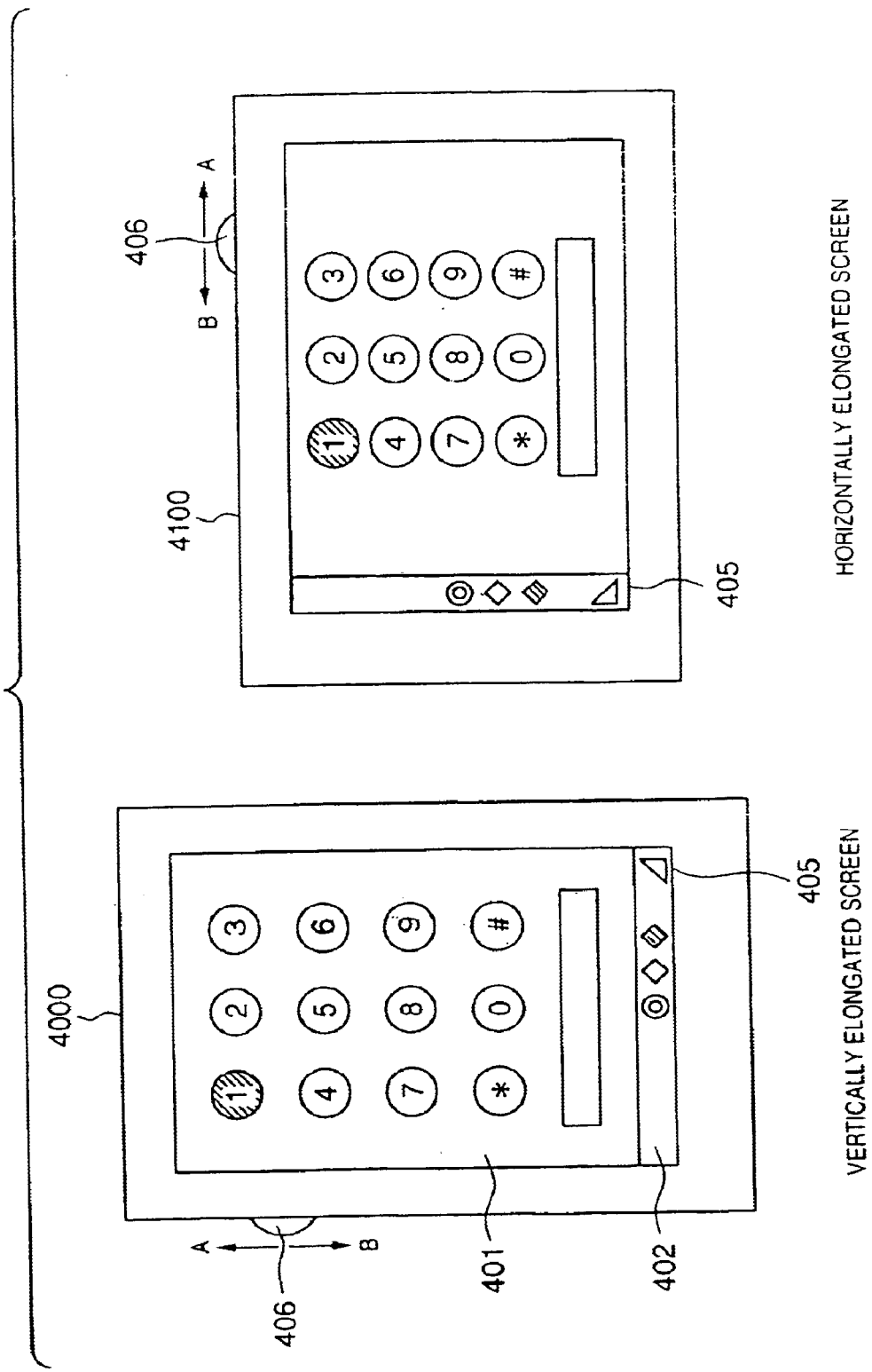
FIG. 6 is a view showing the schematic appearance of a portable terminal device according to the second embodiment.

FIG. 6 is a view showing the schematic appearance of a portable terminal device according to the second embodiment.

As shown in FIG. 6, a vertically elongated screen 4000 displays the push buttons of a telephone set.

On the vertically elongated screen 4000, a button "1" is focused. The focus on the button can be sequentially switched by rotating a jog dial switch 406.

A jog dial operation switch in the second embodiment will be described with reference to FIG. 6.

The jog dial operation switch in the second embodiment is a table for managing control information for the operation of the display window with respect to the operation of the jog dial switch 406 on each of the vertically elongated screen 4000 and a horizontally elongated screen 4100 in FIG. 6. More specifically, this table manages control information for realizing the following operations.

Vertically Elongated Screen (1) Rotation of Jog Dial Switch 406 of Vertically Elongated Screen 4000 in Direction A The focus is switched in the following order:
"1"→"#"→"9"→"6"→"3"→"0"→"8"→"5"→"2"→"*"
→"7"→"4"→"1"→

(2) Rotation of Jog Dial Switch 406 of Vertically Elongated Screen 4000 in Direction B The focus is switched in the following order:
"1"→"4"→"7"→"*"→"2"→"5"→"8"→"0"→"3"
"6"→"9""#" →"1" →

Horizontally Elongated Screen (1) Rotation of Jog Dial Switch 406 of Horizontally Elongated Screen 4100 in Direction A The focus is switched in the following order:
"1"→"2"→"3"→"4"→"5"→"6"→"7"→"8"→"9"→"*"
→"0"→"#"→"1"→

(2) Rotation of Jog Dial Switch 406 of Horizontally Elongated Screen 4100 in Direction B The focus is switched in the following order:
"1"→"#"→"0"→"*"→"9"→"8"→"7"→"6"→"5"→"4"
→"3"→"2"→"1"→

When the display direction of the portable terminal device coincides with the vertically elongated screen 4000, control information of the jog dial operation table for the vertically elongated screen is set. When the display direction of the portable terminal device coincides with the horizontally elongated screen 4100, control information of the jog dial operation table for the horizontally elongated screen is set.

Since the second embodiment can make the moving direction of the focus on the button coincide with the rotational direction of the jog dial switch 406, the user can attain high operability.

The first and second embodiments can be simultaneously practiced by switching them in accordance with the application when the portable terminal device includes a plurality of applications. In this case, a jog dial operation table is prepared for each application.

Third Embodiment

In the first and second embodiments, if the display direction is changed, the operating direction of the jog dial switch is automatically changed. Alternatively, the user may arbitrarily designate this operating direction. The operating direction is designated by, e.g., pushing the jog dial switch. Processing in this case will be explained with reference to FIG. 7.

Figure 7:
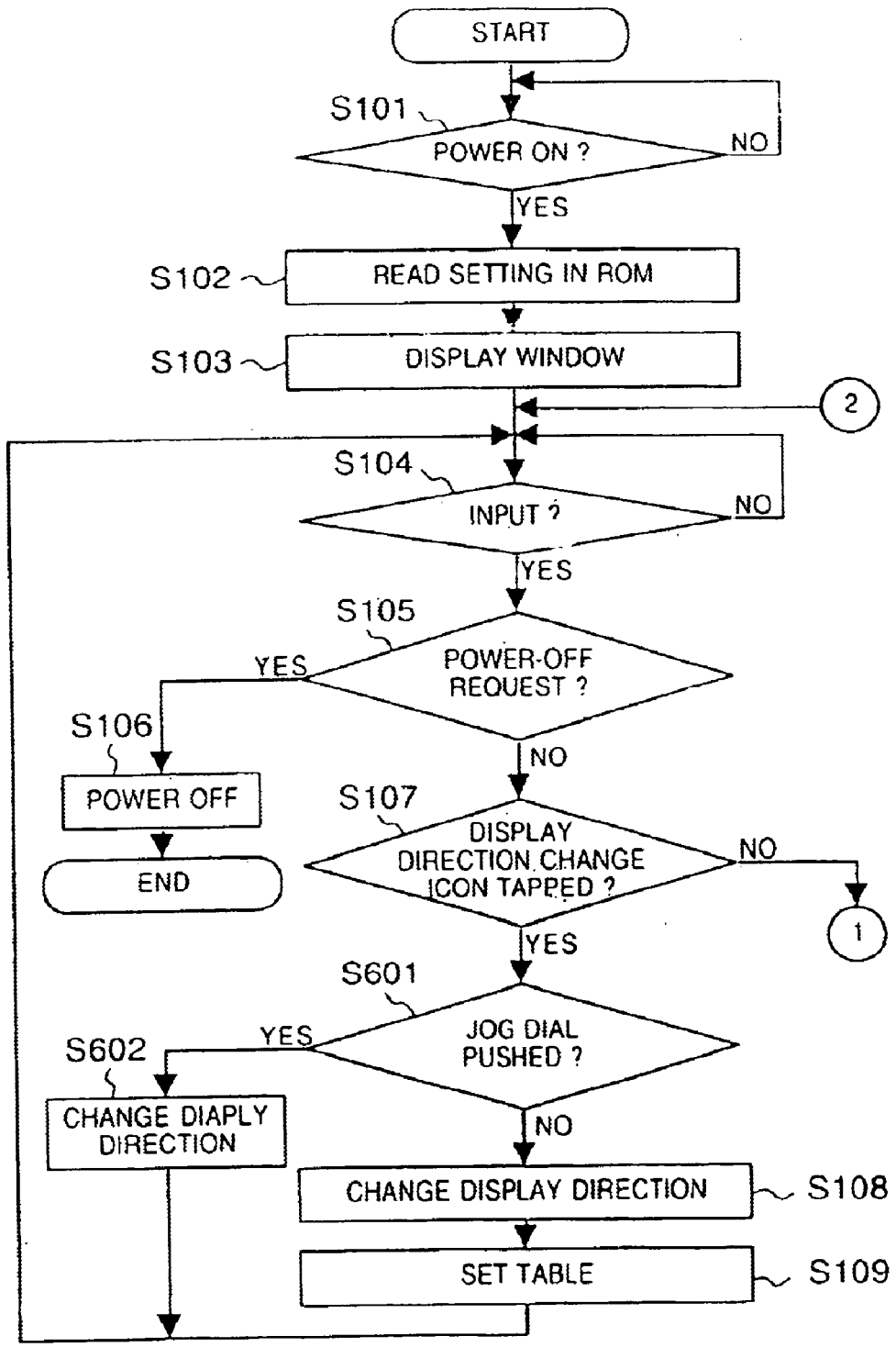
FIG. 7 is a flow chart showing processing executed in the third embodiment.

FIG. 7 is a flow chart showing processing executed in the third embodiment.

The same step numbers as in the first embodiment denote the same steps, and a description thereof will be omitted.

If a display direction change icon 405 is determined in step S107 to be tapped, whether a jog dial switch 406 has been pushed is checked (step S601). If the jog dial switch 406 has not been pushed (NO in step S601), the flow shifts to step S108. If the jog dial switch 406 has been pushed (YES in step S601), the flow shifts to step S602 to change the display window without changing control information of the jog dial operation table for the currently set display direction, and returns to step S104 to wait for an input.

As described above, the third embodiment can arbitrarily change the operating direction of the jog dial switch in accordance with the intended use of the user.

Since the user can decide whether an operation corresponding to the operation of the jog dial switch is changed in accordance with the display direction of the portable terminal device, the user can operate the device in a preferable environment.

In the third embodiment, the operating direction of the jog dial switch is changed based on whether the jog dial switch has been pushed. However, the present invention is not limited to this. For example, the operating direction can be changed by another method, e.g., tapping or double-tapping the display direction change icon.

Fourth Embodiment

In the first embodiment, the operation of the jog dial switch 406 is associated with vertical scroll on the vertically elongated screen 4000, and horizontal scroll on the horizontally elongated screen 4100. In the second embodiment, the focus moving direction is the vertical direction on the vertically elongated screen 4000, and the horizontal direction on the horizontally elongated screen 4100. In this manner, different jog dial operation tables are adopted for the jog dial switch 406. Alternatively, a different change method can be employed.

In the first embodiment, for example, the operation of the jog dial switch 406 can be kept associated with vertical scroll on both the vertically elongated screen 4000 and horizontally elongated screen 4100, and control information set in the jog dial operation table can be exchanged in accordance with the directions A and B of the jog dial switch 406.

A jog dial operation table in the fourth embodiment will be explained with reference to FIG. 8.

Figure 8:
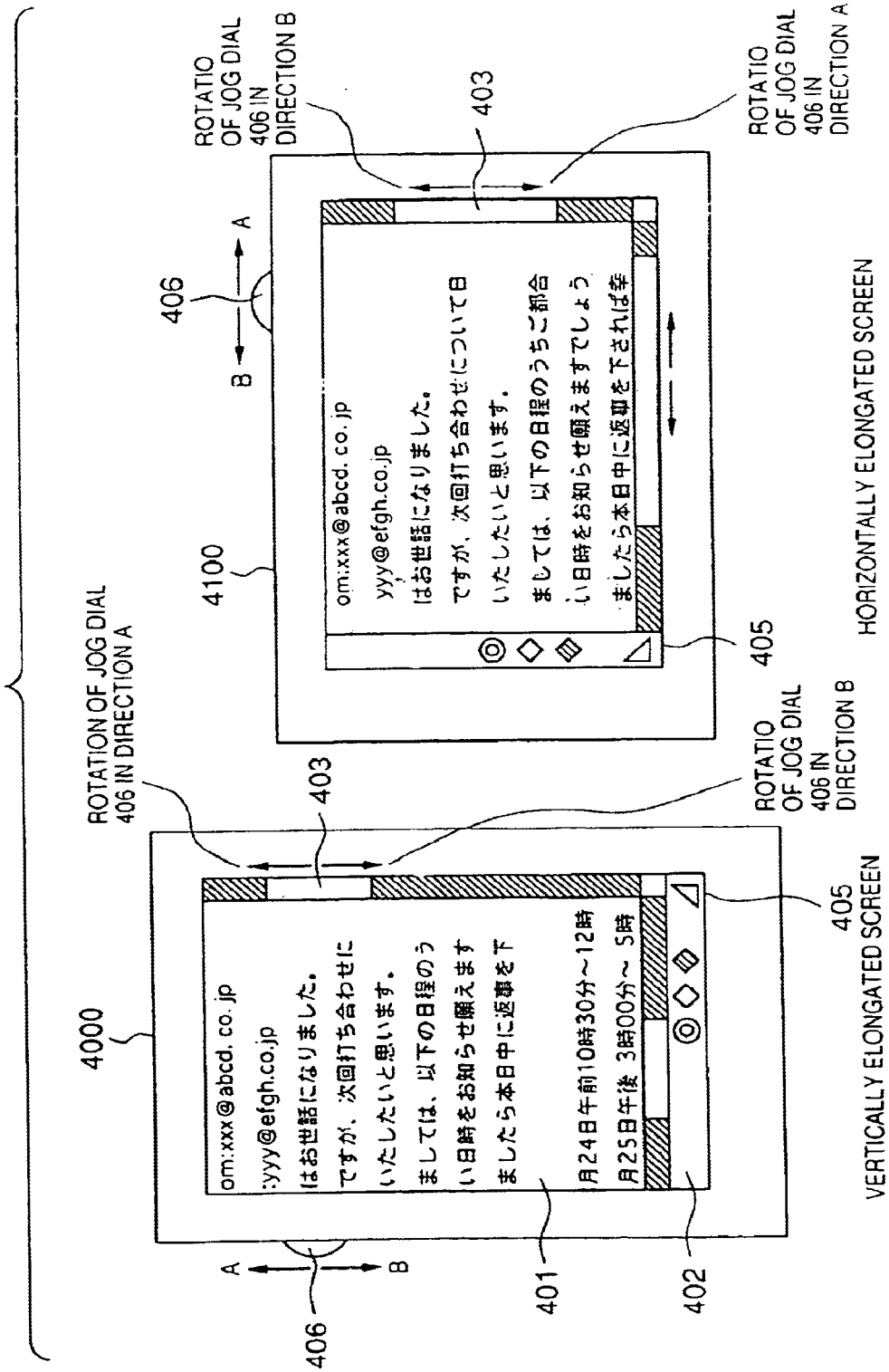
FIG. 8 is a view showing the schematic appearance of a portable terminal device according to the fourth embodiment.

FIG. 8 is a view showing the schematic appearance of a portable terminal device according to the fourth embodiment.

The jog dial operation table in the fourth embodiment is a table for managing control information for the operation of the display window with respect to the operation of a jog dial switch 406 on each of a vertically elongated screen 4000 and horizontally elongated screen 4100 in FIG. 8. More specifically, this table manages control information for realizing the following operations.

Vertically Elongated Screen (1) Rotation of Jog Dial Switch 406 of Vertically Elongated Screen 4000 in Direction A A scroll bar 403 moves up in accordance with the rotation amount, and display contents in the window are scrolled up in accordance with the rotation amount.

(2) Rotation of Jog Dial Switch 406 of Vertically Elongated Screen 4000 in Direction B The scroll bar 403 moves down in accordance with the rotation amount, and display contents in the window are scrolled down in accordance with the rotation amount.

Horizontally Elongated Screen (1) Rotation of Jog Dial Switch 406 of Horizontally Elongated Screen 4100 in Direction A The scroll bar 403 moves down in accordance with the rotation amount, and display contents in the window are scrolled down in accordance with the rotation amount.

(2) Rotation of Jog Dial Switch 406 of Horizontally Elongated Screen 4100 in Direction B The scroll bar 403 moves up in accordance with the rotation amount, and display contents in the window are scrolled up in accordance with the rotation amount.

Processing executed in the fourth embodiment is the same as that shown in FIGS. 4 and 5, and a description thereof will be omitted.

According to the fourth embodiment, rotation operation of the jog dial switch 406 corresponds to vertical scroll regardless of whether the display direction of the portable terminal device coincides with the vertically elongated screen 4000 or horizontally elongated screen 4100. In general, the user holds a portable terminal device in his/her left hand and operates the jog dial switch 406 with his/her left thumb. Considering this, the display window on the vertically elongated screen 4000 is scrolled up when the user's finger moves upward, and scrolled down when the user's finger moves downward. The display window on the horizontally elongated screen 4100 is scrolled down, i.e., in a direction in which the text is read forward when the user's finger stretches in a rising direction, and scrolled up, i.e., in a direction in which the text is read backward when the user's finger bends in a retreat direction. This structure can implement an ergonomic user-friendly device.

The first to fourth embodiments have exemplified processing for the operating direction of the jog dial switch. This also applies to the shuttle switch.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, the storage medium stores program codes corresponding to the flow charts shown in FIGS. 4, 5, and 7.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:

display means for displaying information in a display region, wherein the display region has an adjustable orientation, and wherein the information displayed in the display region has an orientation controllable to correspond to the orientation of the display region;

input means affixed to the information processing apparatus for inputting directional information, wherein said input means is a jog dial switch or a shuttle switch;

designation means for designating a display orientation of the display region;

storage means for storing a management table for storing control signals, wherein said management table is indexed by directional information and display orientation; and control means for controlling the scrolling of information displayed in the display region by selecting control signals stored in the management table corresponding to the directional information input by said input means and the display orientation designated by said designation means.

2. The apparatus according to claim 1, wherein the display region has a rectangular shape, and can be oriented in a vertical direction for displaying a display window with a long side of the rectangle directed vertically, or in a horizontal direction for displaying the display window with the long side directed horizontally, wherein, when said display region is oriented in a vertical direction, said control signals control a vertical scroll operation, and wherein, when the display region is oriented in a horizontal direction, said control signals control a horizontal scroll operation.

3. The apparatus according to claim 1, wherein said display region has a rectangular shape, and can be oriented in a vertical direction for displaying a display window with a long side of the rectangle directed vertically, or in a horizontal direction for displaying the display window with the long side directed horizontally, wherein, when the display region is oriented in a vertical direction, said control signals control a vertical scroll operation, and wherein, when the display region is oriented in a horizontal direction, said control signals control a vertical scroll operation.

4. An information processing apparatus comprising:

display means for displaying information in a display region, wherein the display region has an adjustable orientation, and wherein the information displayed in the display region has an orientation controllable to correspond to the orientation of the display region;

input means affixed to the information processing apparatus for inputting directional information, wherein said input means is a jog dial switch or a shuttle switch;

designation means for designating a display orientation of the display region;

storage means for storing a management table for storing control signals, wherein said management table is indexed by directional information and display orientation; and control means for controlling a focusing operation to a plurality of focusing targets displayed in the display region by selecting control signals stored in the management table corresponding to the directional information input by said input means and the display orientation designated by the designation means.

5. The apparatus according to claim 1 or 4, wherein said designation means includes a predetermined icon in the display region.

6. The apparatus according to claim 1 or 4, wherein said control means comprises change means for changing the control signals stored in the management table by adjusting said input means.

7. A control method for an information processing apparatus, said method comprising:

a display step of displaying information in a display region, wherein the display region has an adjustable orientation, and wherein the information displayed in the display region has an orientation controllable to correspond to the orientation of the display region;

an input step of inputting directional information using a jog dial or a shuttle switch affixed to the information processing apparatus;

a designation step of designating a display orientation of the display region;

a storage step of storing a management table for storing control signals, wherein the management table is indexed by directional information and display orientation; and a control step of controlling the scrolling of information displayed in the display region by selecting control signals stored in the management table corresponding to the directional information input in the input step and the display orientation designated in the designation step.

8. The method according to claim 7, wherein the display region has a rectangular shape, and can be oriented in a vertical direction for displaying a display window with a long side of the rectangle directed vertically, or in a horizontal direction for displaying the display window with the long side directed horizontally, wherein, when the display region is oriented in a vertical direction, said control signals control a vertical scroll operation, and wherein, when the display region is oriented in a horizontal direction, the control signals control a horizontal scroll operation.

9. The method according to claim 7, wherein the display region has a rectangular shape, and can be oriented in a vertical direction for displaying a display window with a long side of the rectangle directed vertically, or in a horizontal direction for displaying the display window with the long side directed horizontally, wherein, when the display region is oriented in a vertical direction, said control signals control a vertical scrolling operation, and wherein, when the display region is oriented in a horizontal direction, said control signals control a vertical scroll operation.

10. An control method for an information processing apparatus, said method comprising:

a display step of displaying information in a display region, wherein the display region has an adjustable orientation, and wherein the information displayed in the display region has an orientation controllable to correspond to the orientation of the display region;

an input step of inputting directional information using a jog dial or a shuttle switch affixed to the information processing apparatus;

a designation step of designating a display orientation of the display region;

a storage step of storing a management table for storing control signals, wherein the management table is indexed by directional information and display orientation; and a control step of controlling a focusing operation to a plurality of focusing targets displayed in the display region by selecting control signals stored in the management table corresponding to the directional information input in said input step and the display orientation designated in the designation step.

11. The method according to claim 7 or 10, wherein said designation step includes displaying a predetermined icon in the display region.

12. The method according to claim 7 or 10, wherein said control step comprises a change step of changing the control signals stored in the management table by adjusting the jog dial or shuttle.

13. A computer-readable memory which stores program codes for controlling an information processing apparatus, said computer-readable memory comprising program codes of:

a display step of displaying information in a display region, wherein the display region has an adjustable orientation, and wherein the information displayed in the display region has an orientation controllable to correspond to the orientation of the display region;

an input step of inputting directional information using a jog dial switch or a shuttle switch affixed to the information processing apparatus;

a designation step of designating a display orientation of the display region;

a storage step of storing a management table for storing control signals, wherein said management table is indexed by directional information and display orientation; and a control step of controlling the scrolling of information displayed in the display region by selecting control signals stored in the management table corresponding to the directional information input in said input step and the display orientation designated in said designation step.

14. The apparatus according to claim 4, wherein the display region has a rectangular shape, and can be oriented in a vertical direction for displaying a display window with a long side of the rectangle directed vertically, or in a horizontal direction for displaying the display window with the long side directed horizontally, wherein, when the display region is oriented in a vertical direction, said control signals control a vertical focusing operation, and wherein, when the display region is oriented in a horizontal direction, said control signals control a horizontal focusing operation.

15. The method according to claim 10, wherein the display region has a rectangular shape, and can be oriented in a vertical direction for displaying a display window with a long side of the rectangle directed vertically, or in a horizontal direction for displaying the display window with the long side directed horizontally, and wherein, when the display region is oriented in a vertical direction, said control signals control a vertical focusing operation, and wherein, when the display region is oriented in a horizontal direction, said control signals control a vertical focusing operation.

16. A computer-readable memory for storing program code for controlling an information processing apparatus, said program code comprising:

code for a display step of displaying information in a display region, wherein the display region has an adjustable orientation, and wherein the information displayed in the display region has an orientation controllable to correspond to the orientation of the display region;

code for an input step of inputting directional information using a jog dial or a shuttle switch affixed to the information processing apparatus;

code for a designation step of designating a display orientation of the display region;

code for a storage step of storing a management table for storing control signals, wherein the management table is indexed by directional information and display orientation; and code for a control step of controlling a focusing operation to a plurality of focusing targets displayed in the display region by selecting control signals stored in the management table corresponding to the directional information input in said input step and the display orientation designated in the designation step.

* * * * *

UNITED STATES PATENT AND TRADEMARK OFFICE
CERTIFICATE OF CORRECTION

PATENT NO. : 6,963,349 B1 Page 1 of 1
APPLICATION NO. : 09/619540
DATED : November 8, 2005
INVENTOR(S) : Nagasaki It is certified that error appears in the above-identified patent and that said Letters Patent is hereby corrected as shown below:

COVER PAGE:
(57) ABSTRACT, line 3, "operation" should read -- operation of --.

COLUMN 3:
Line 48, "a" should read -- an --.

COLUMN 5:
Line 58, "VARM" should read -- VRAM --.

COLUMN 7:
Line 45, ""6"→"9""#"→"1"→" should read -- "6"→"9"→"#"→"1"→--.

COLUMN 12:
Line 16, "An" should read -- A --; and
Line 45, "shuttle." should read -- shuttle switch. --.

Signed and Sealed this

Twenty-fourth Day of October, 2006

JON W. DUDAS
*Director of the United States Patent and Trademark Office*